United States Patent [19]

Becker et al.

[11] 4,121,208
[45] Oct. 17, 1978

[54] DEVICE FOR INCREASING THE SAFETY WITH RESPECT TO TRANSMISSION FAULTS IN AN INFORMATION TRANSMISSION SYSTEM

[75] Inventors: Friedbert Becker; Wilhelm Grafinger, both of Munich; Bernhard Hildebrandt, Hochbrück, all of Germany

[73] Assignee: Siemens Aktiengesellschaft, Berlin & Munich, Germany

[21] Appl. No.: 776,766

[22] Filed: Mar. 11, 1977

[30] Foreign Application Priority Data

Mar. 26, 1976 [DE] Fed. Rep. of Germany ....... 2612968

[51] Int. Cl.² .............................................. G01S 9/56
[52] U.S. Cl. ............................ 343/6.5 R; 343/6.5 LC
[58] Field of Search ......... 343/6.5 R, 6.5 SS, 6.5 LC, 343/6.8 R

[56] References Cited

U.S. PATENT DOCUMENTS

| | | | |
|---|---|---|---|
| 3,863,244 | 1/1975 | Lichtblau | 343/6.5 SS |
| 3,969,725 | 7/1976 | Couvillon et al. | 343/6.5 R |
| 4,037,227 | 7/1977 | Kline | 343/6.5 R |

*Primary Examiner*—S. C. Buczinski

*Attorney, Agent, or Firm*—Hill, Gross, Simpson, Van Santen, Steadman, Chiara & Simpson

[57] ABSTRACT

A device for increasing security with respect to transmission faults in an information transmission system, particularly for the railroad field, in which an interrogation device and a passive response device are movable relative to one another, and the interrogation device transmits an interrogation signal, which can be periodically swept through a predetermined frequency band, preferably in the microwave range, and which during a read operation, receives during several periods from the passive response device, a frequency-selectively reflected interrogation signal, in accordance with a k-digit information item to be transmitted, which signal forms the response signal in which the interrogation device is provided with means for amplifying each response signal, until there is reached a predetermined threshold level of the low-frequency portions of the response signals, which are below the frequency of the periodic interrogation sweep, with the amplification that the low-frequency portions thereafter being so reduced that they do not undesirably exceed the threshold value, and means being provided for preventing a through-connection of a transmitted information item in the presence of a decreasing and/or increasing level of such low-frequency portion.

8 Claims, 5 Drawing Figures

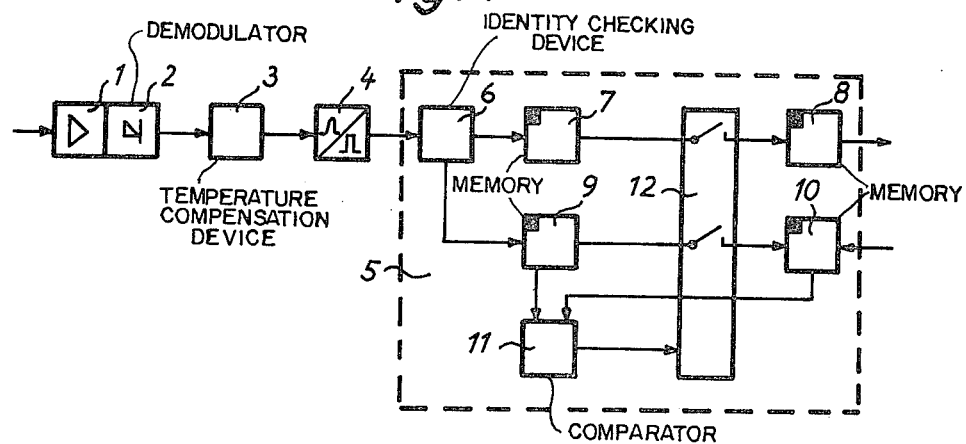
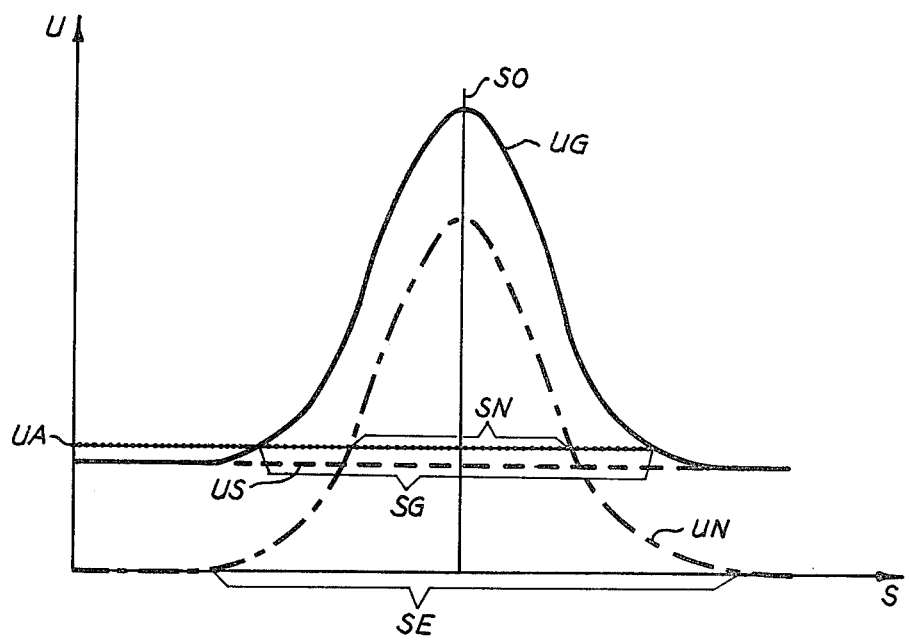

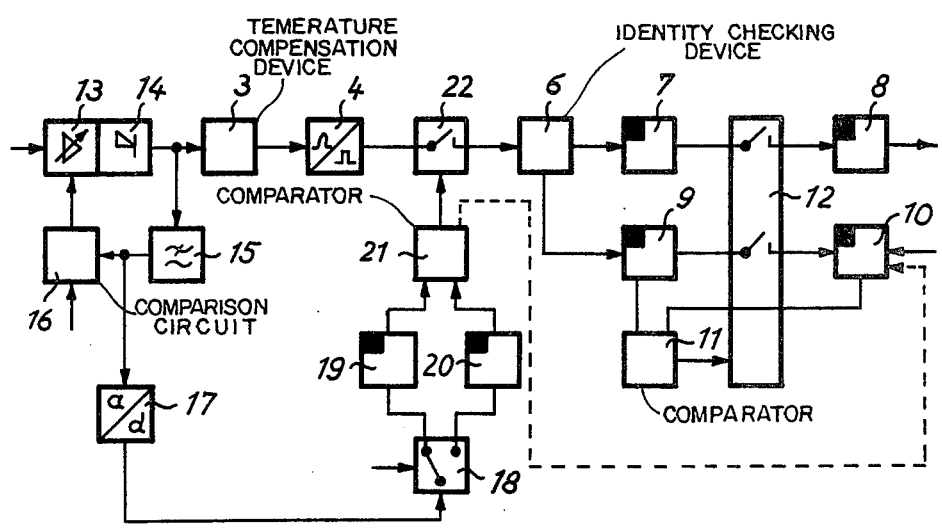

4,121,208

DEVICE FOR INCREASING THE SAFETY WITH RESPECT TO TRANSMISSION FAULTS IN AN INFORMATION TRANSMISSION SYSTEM

BACKGROUND OF THE INVENTION

The invention relates to a device for increasing security with respect to transmission faults in an information-transmission system, particularly for the railroad field, in which an interrogation device and a passive response device are movable relative to one another, and the interrogation device transmits an interrogation signal, which can be periodically swept through a predetermined frequency band, preferably in the microwave range, and which during a read operation, receives during several periods from the passive response device, a frequency-selectively reflected interrogation signal, in accordance with a $k$-digit information item to be transmitted, which signal forms the response signal.

This type of microwave transmission system for sequential or successive information transmission between a passive response device and an active inquiry device is described, for example, in the publication "aci-report 8" of the Siemens Company. The system can be utilized for transmission of car or vehicle data to a stationary line or track installation, or line or track data to a car or vehicle in dependence upon the disposition of the interrogation and the cooperable passive devices.

As a result of the high reading speed of the interrogation device, each response device repeatedly transmits its information, in coded form, a number of times. Consequently, it is possible by means of suitable code and identify checking devices to select that information item of those transmitted during a read operation, with the fewest errors. Selection thereof, can be accomplished with a device such as illustrated in German Pat. No. 2,101,105, as a result of which a substantial increase in the transmission security of this system can be achieved. Such known checking device has the characteristic, in a read operation, of evaluating as "correct" information which it has recognized as identical to prior information, with such information then being through-connected for transmission by the response device to further processing devices, independently of whether additional following code correct and identical pieces of information are determined during such a read operation.

It will be appreciated that during the reflection from a response device, the reflected signal of the interrogation device, representing the response signal for the inquiry device, will appear as a useful signal in the receiving branch of the interrogation device, and such useful signal will rise above a noise level occasioned, for example, by interfering signals, such as interferring reflections, with the response signal increasing to a maximum value and then diminishing. Falsification in such a response signal which cannot be recognized by the code and identity checking device most probably occurs in a transition range in which the interference signal level and the useful signal level are of about equal magnitude. However, if this type of falsified information has once been evaluated as "correct," in a device such as that illustrated in German Pat. No. 2,101,105, such information is undesirably through-connected independently of whether true and correct information occurs during the remainder of the read operation involved.

BRIEF SUMMARY OF THE INVENTION

The invention therefore has among its objects the production of a device which increases security with respect to transmission errors in the designated transmission range.

This objective is achieved in a device in accordance with the invention, in which the interrogation device is provided with a detector system which amplifies each response signal, and which, when there is reached a predetermined threshold level of the low-frequency portions of the response signals, which are below the frequency of the periodic interrogation sweep, so reduces the amplification that the low-frequency portions do not undesirably exceed the threshold value, with means being provided for preventing a through-connection of a transmitted information item in the presence of a decreasing and/or increasing level of such low-frequency portion.

BRIEF DESCRIPTION OF THE DRAWINGS

In the drawings wherein like reference characters indicate like or corresponding parts:

FIG. 1 is a schematic diagram of the receiving branch of an interrogation device of the prior art;

FIG. 2 is a chart illustrating the level of the output signal of an unregulated input circuit in the receiving branch of an interrogation device during reception from a response device;

FIG. 5 is an examplary schematic circuit of an embodiment of the invention.

DETAILED DESCRIPTION OF THE INVENTION

Figure 3:
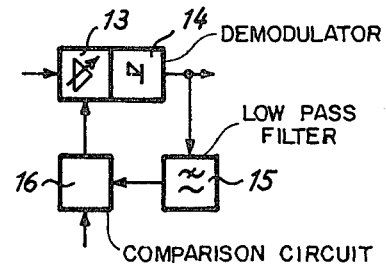
FIG. 3 is a schematic circuit of a regulated input circuit for a reception branch, in accordance with the prior art.

Referring to FIG. 1, which illustrates the schematic circuit of the receiving branch of an interrogation device of known type such as described in the previously referred to aci-report 8. In such a circuit, the received reflected signal from the interrogation device is conducted from an antenna, which for simplicity is not illustrated, to an amplifier 1 having a constant amplification and is subsequently conducted to a demodulator 2, with the latter and the amplifier 1 thus constituting an unregulated input circuit. The amplified and demodulated signal is conducted to a temperature compensation device 3 which, for example, can be constructed in accordance with German Pat. No. 1,591,595, causing a slight time delay for the signal, which, however, is of negligible importance insofar as the functioning of the present invention is concerned. The signal is then conducted over a pulse-shaper stage 4 to a device indicated generally by the reference numeral 5, which is operative to select the information with the fewest errors from a plurality of successive transmissions of the same $k$-digit information, which mechanism likewise is known from German Pat. No. 2,101,105.

In general, the device 5 comprises a code and identify checking device 6 which assigns an error designation or identification mark or value to each piece of information, indicating how many of the digits of the particular information obviously are incorrect as a result of such checking indicates, and further includes memories 7, 8, 9 and 10, a comparator 11 and a transfer switch 12. Prior to the beginning of each read operation, a limiting value is entered into the store 10 which value indicates or represents the number of digits of the $k$-digit information which may, as a maximum, be falsified, without prevenint any further processing of the information.

At the beginning of a read operation, upon the first $k$-digit information being received at the code and identify checking device 6, the latter will effect a check thereof with respect to the number of falsified digits, and passes the information thereof into the memory 7, simultaneously entering an error designation mark or value into the memory 9. A comparator 11 receives the error value from the memory 9 and the initial limiting value from the memory 10 and makes a comparison therebetween. If the error designation or value from the memory 9 is smaller than the limiting value from the memory 10 the transfer switch 12 is actuated over an output line of the comparator 11 whereby the content of the memory 7 passes into memory 8 and content of memory 9 passes into memory 10. Thus, each time during a read operation the information has an error designation value which is smaller than the currently stored value in the memory 10, such information passes into memory 8 and its associated error designation value is passed into memory 10. Consequently, at the end of a read operation, the transmitted information in memory 8 is that which was first to be transmitted with the smallest error designation value during the corresponding read operation. Such information can then be obtained from such memory be subsequently connected evaluation devices.

The mode of operation of the device illustrated in FIG. 1 may be explained in connection with FIG. 2 which illustrates how the level of the output signal of the unregulated input circuit, according to FIG. 1, changes in dependence on the received signal, during the reception of a signal from a response device. In FIG. 2 the reference letter S designates the lateral displacement or shift of the interrogation and response devices with the point SO designating the position at which the interrogation and response devices are directly opposite one another, without lateral displacement.

Curve UN illustrates the signal level curve of the response signal functioning as the useful level, the signal illustrated being that following the amplification by the amplifier 1. Such useful level UN rises in the influence range SE of the response device. It is assumed in FIG. 2 that a constant noise level US exists which is conditional on interference signals also amplified by the amplifier 1, with the sum of the useful level UN and noise level US being represented by the curve UG as the total level and which thus may be considered as the amplified level of the reception signal of the interrogation device.

In order to avoid any influence of the noise level US on the signal evaluation, a response level threshold UA is selected for the pulse-shaper stage 4, whereby the total level UG then exceeds the response level threshold UA in a maximum response range SG or, with a complete subsiding of the noise level, in a response range SN. Since the number of information transmissions during a read operation depends directly on the width of the response range, obviously it is desirable to set the response threshold UA as low as possible. However, as a result thereof, the signal-to-noise ratio with respect to the noise level US undesirably decreases. Consequently, the dimensioning of the response level threshold UA can be arrived at only in the form of a compromise between the demand for the most frequent possible transmission of information during a read operation, and the demand for the largest possible signal-to-noise ratio. It has been found that a favorable improvement can be achieved in this respect if a regulated input circuit, for example as illustrated in FIG. 3, is substitued for the unregulated input circuit illustrated in FIG. 1.

In the regulated circuit illustrated, the received signal is supplied to an amplifier 13, whose amplification is adjustable. The signal amplified thereby may be demodulated by means of a demodulator 14, which can be similarly constructed to the demodulator 2 of FIG. 1.

The demodulated signal may be conducted, in accordance with FIG. 1, to a temperature compensation mechanism 3, and, in addition, is also conducted to a low pass 15 whose cutoff frequency is below the sweep frequency of the interrogation signal, and which supplies to the output thereof a voltage, representing a regulating variable, which is compared in a comparison circuit 16 with an externally supplied reference direct voltage, which maybe considered a command variable. The difference signal so determined may then be supplied to the amplifier 13 whereby the amplification thereof is reduced in proportion to the correcting variable. In view of the selected cutoff frequency of the low pass, it is assured that the modulation of the received signal will not be undesirably affected.

Figure 4:
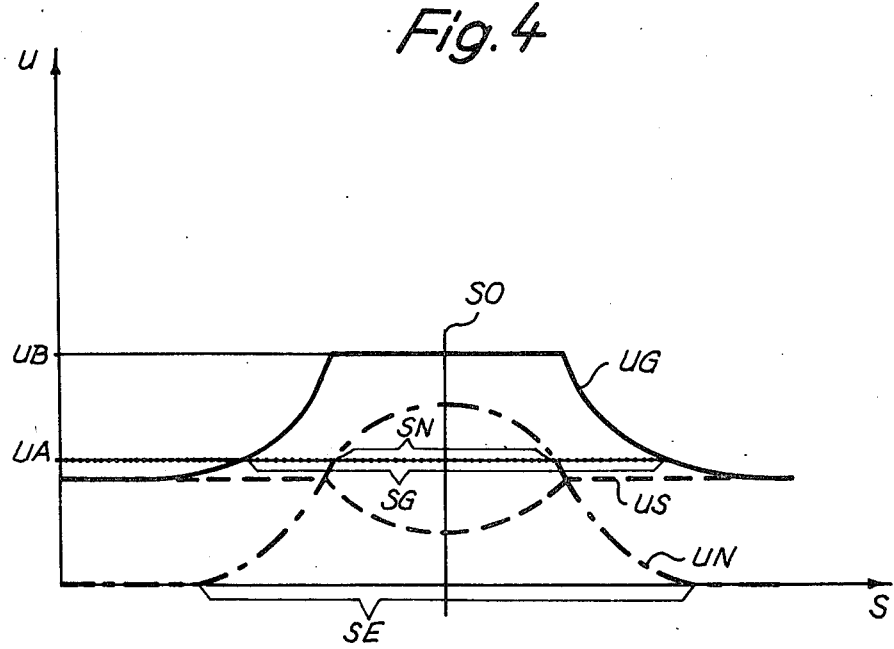
FIG. 4 is a chart similar to FIG. 3 illustrating the level of the output signal of a regulated input circuit such as illustrated in FIG. 3.

FIG. 4 illustrates the course of the level U of the output signal of a regulated input circuit which is disposed in the receiving branch of an interrogation device according to FIG. 1, with the selected designations in FIG. 4 corresponding to those of FIG. 2. In like manner, the response signal, interference signal and, therefore, also the received signal of the regulated and of the unregulated receiving circuits correspond. However, a further factor is depicted in FIG. 4, namely a delimiting threshold UB which is supplied by the reference direct voltage. Thus, the maximum amplification of amplifier 13 which, in the selected example, corresponds to the amplification of amplifier 1, is effective up to such delimiting threshold, and in the event the total level UG of the regulated receiving cicuit exceeds a value which, while maintaining the maximum amplification, would make the level U of the output signal exceed the delimiting threshold UB, the amplification of the regulatable amplifier 3 is so reduced that the level U of the output signal is maintained at the value of the delimiting threshold UB. Consequently, as compared with unregulated input circuit, in the regulated input circuit, with an identical response threshold UA, and equally large minimum and maximum response ranges SN or SG, respectively, the signal-to-noise ratio between the response threshold UA and the noise level US increases with the reduction in the amplification of the regulatable amplifier 13.

However, even when the regulated input circuit is employed, there remains the disadvantage that information falsification, which cannot be recognized by the code and identity-test system, can occur, especially in the junction range in which the interference and useful signal levels are approximately equal. The invention provides a solution to this problem, in a very simple manner, for entirely suppressing an information transmission in this junction range. As will be apparent from a reference to FIG. 4, with the utilization of a regulated input circuit in accordance with FIG. 3, an increase or decrease of the entire level UG will occur only in the junction range when the boundary threshold UB is adjusted to approximately double the interference level US.

In an exemplary embodiment of the invention, illustrated in FIG. 5, a signal is supplied from the regulated input circuit, over a low pass filter 15, and is converted in a digital-analog converter 17, with the output signal of the latter being conducted to a pulse-actuated time-controlled switch 18 which alternately supplies the digital signal to two memories 19 and 20. The switch-over pulse can, in this case, be supplied from a timing generator of the digital-analog converter 17, which for clarity has not been illustrated.

The storage contents of the memories 19 and 20 are compared in a comparator 21, a first control output of which controls a switch 22, which is adapted to be set into its closed position only during an increase "O" of the course of the entire level UG, and thus during equality of the contents of the memories 19 and 20. Consequently, this position provides the operative connection between the impulse-generator stage 4 and the code and identity-test system 6.

The connection, illustrated in broken lines, indicates that the comparator 21 can, over a second control output, supply a passage-end signal for setting the memory 10 to its limiting value, when the comparator detects a negative increase in the course of the total level UG. If is also possible that the comparator 21, over a third control output, not illustrated for the sake of clarity, supplies a passage-beginning signal when it detects a positive increase in the course of the total level.

It will be appreciated that it is possible to employ component elements of analog technology, in place of the digital component elements, in the contruction of a device incorporating the invention.

We claim as our invention:

1. In a device for increasing security with respect to transmission faults in an information-transmission system, particularly for the railroad field, in which an interrogation device and a passive response device are movable relative to one another; the interrogation device transmitting an interrogation signal, which can be periodically swept through a predetermined frequency band, preferably in the microwave range; the interrogation device receiving, during a read operation of at least two periods from the passive response device, a frequency-selectively reflected interrogation signal, in accordance with a k-digit information item to be transmitted; the combination of means for amplifying such a reflected interrogation signal received by the interrogation device; means for monitoring the level of the low-frequency portions of such a reflected interrogation signal lying below the sweep frequency of the interrogation device and for reducing the amplification of said amplifying means if the level of such low frequency portions reaches a predetermined threshold value, whereby such low frequency portions do not undesirably exceed such threshold value; switch means for controlling the through-connection of the response signal to subsequent devices; and control means connecting said monitoring and switch means, for controlling the latter to prevent passage of a transmitted information item in the presence of a decreasing and/or increasing level of such low frequency portion.

2. A device according to claim 1, wherein said monitoring means includes means for providing a signal for indicating the end of a read operation of at least two periods, if a decreasing level of the low-frequency portions takes place.

3. A device according to claim 1, wherein said monitoring means includes means for providing a signal for indicating the beginning of a read operation of at least two periods, if an increasing level of the low-frequency portions takes place.

4. A device according to claim 3, wherein said monitoring means includes means for providing a signal for indicating the end of a read operation of at least two periods, if a decreasing level of the low-frequency portions takes place.

5. A device according to claim 1, wherein said control means comprises a comparator; and said monitoring means comprises a pair of memories and further switching means; the outputs of the memories being connected to respective inputs of the comparator and the output of the latter to said through-connection switch; said further switching means being adapted to alternately connect the inputs of the respective memories for reception of the lower frequency portions of the response signal.

6. A device according to claim 5, wherein said monitoring means includes means for providing a signal for indicating the end of a read operation of at least two periods, if a decreasing level of the low-frequency portions takes place.

7. A device according to claim 5, wherein said monitoring means includes means for providing a signal for indicating the beginning of a read operation of at least two periods, if an increasing level of the low-frequency portions takes place.

8. A device according to claim 7, wherein said monitoring means includes means for providing a signal for indicating the end of a read operation of at least two periods, if a decreasing level of the low-frequency portions takes place.

* * * * *